3,313,178
MEANS FOR MOVING A MEMBER LINEARLY
Charles William Thomas Saunders, London, England, assignor to Westinghouse Brake and Signal Company, Limited, London, England
Filed Aug. 9, 1965, Ser. No. 478,042
Claims priority, application Great Britain, Aug. 26, 1964, 34,915/64
12 Claims. (Cl. 74—626)

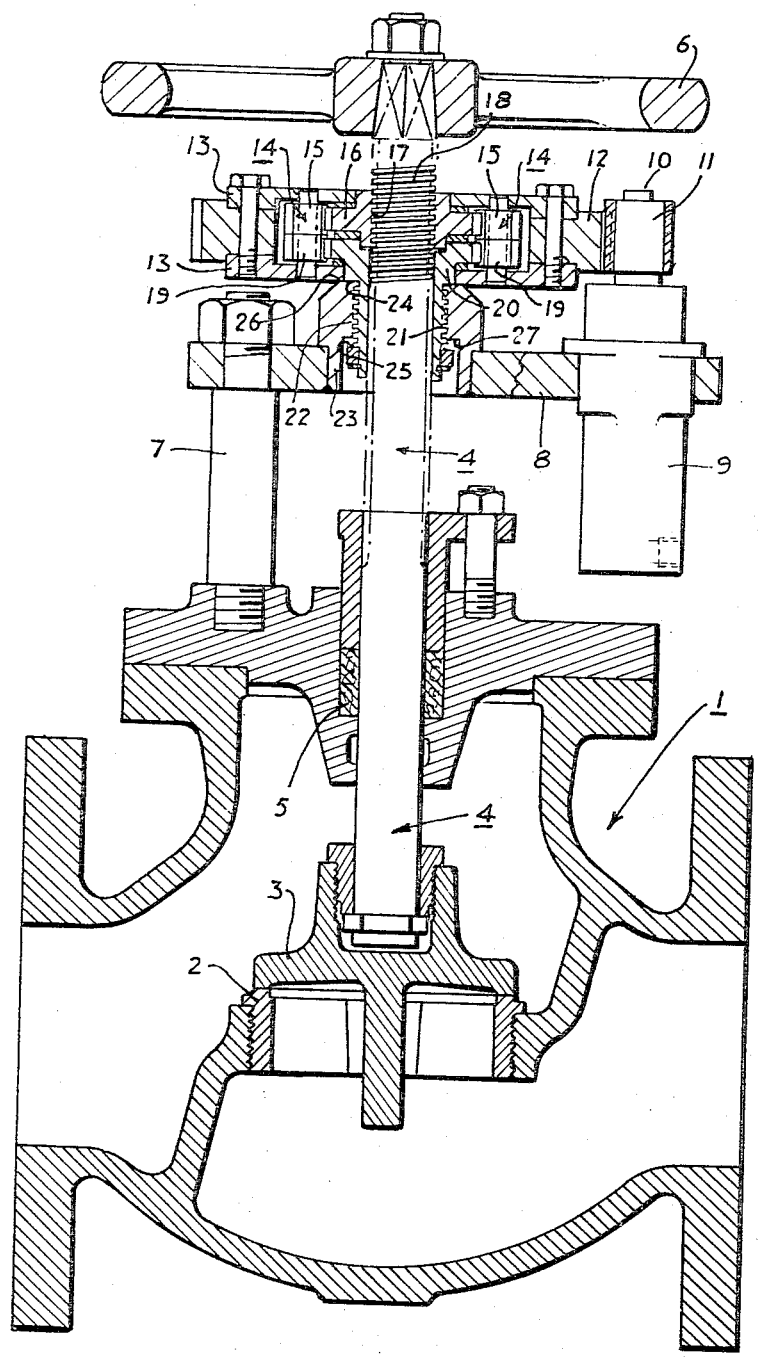

This invention relates to means for moving a member linearly.

The present invention provides means for moving a member constrained for linear movement between two positions, comprising an element which is co-axially rotatable about the member in both directions and which has rotatably mounted thereon planet gears which mesh with two sun gears and which provide with one of the sun gears a first gear ratio and with the second of the sun gears a second gear ratio different from the first gear ratio, said one sun gear having an axially extending screw thread of one hand threadedly engaged with a threaded portion on the member whereby relative rotation of said one sun gear and the member causes linear movement of the member, and said second sun gear having an axially extending screw thread of the opposite hand which threadedly engages a screw-threaded portion of an element thereby relative rotation of said second sun gear and the element causes relative axial motion between said second sun gear and the element, and means for limiting the motion to an extent which is less than the extent of the linear movement of the member between its two positions.

The member may constitute the stem of a screw-down valve, for example, a globe type or a wedge gate type valve. In this case, the member may be constrained for linear movement by packing around the stem, which constraint may be overcome by manual rotation of the stem for which purpose the stem may be provided with a handwheel. Should the packing around the stem be insufficient to constrain the member for linear movement, specific means may be included for providing such restraint. Such specific means may comprise a tooth slidable within a slot extending linearly of the member which tooth, when the member constitutes a stem of a valve, may be withdrawable from the slot to permit rotation of the stem for manual operation of the valve.

The element may comprise a ring gear meshed with a pinion rotatable in both directions by a motor which, conveniently, may be a reversible electric motor.

Conveniently, there may be provided three planet gears but, in any case, each of the planet gears may have one half which is meshed with one sun gear and the other half which is meshed with the other sun gear.

The difference of gear ratios may be provided by a different number of teeth on the sun gears which difference may be one.

The element may be fixed and when the member constitutes the stem of a screw-down valve, the element may be fixed relative to the valve body.

Said means may be shoulders provided on the second sun gear which are engageable with co-operating shoulders on the element.

One embodiment of the present invention will now be described in greater detail, by way of example only, with reference to the accompanying drawing, which shows a cross-sectional view of a screw-down globe type valve incorporating the invention.

Referring to the drawing, the valve (in the well known manner) comprises a valve body 1 in which is located a valve seat 2 engageable (and shown engaged) by a valve closure element 3 carried by a valve stem 4 between which and the valve body 1 is packing 5 to prevent seepage of the fluid control by the valve between the valve stem 4 and the body 1. The valve stem 4 is provided at its upper end with a handwheel 6.

Secured to the body 1 is a pillar 7 which carries a bracket 8 on which is mounted a reversible electrical motor 9. The shaft 10 of the motor 9 is provided with a pinion 11 which meshes with a ring gear 12 clamped between two plates 13 which, together with the ring gear 12 constitutes an element which is co-axially rotatable about the valve stem 4. Rotatably mounted between the two plates 13 are three planet gears 14 (of which two are shown) the upper half 15 of each planet gear 14 meshes with a first sun gear 16 which has an axially extending screw thread 17 of one hand which threadedly engages a threaded portion 18 on the valve stem 4. The lower half 19 of each planet gear 14 engages a second sun gear 20 which has an axially extending screw thread 21 of the opposite hand of the screw thread 17 on the sun gear 16. The screw thread 21 of the sun gear 20 threadedly engages a screw threaded portion 22 of an element 23 which is fixed to the bracket 8 and therefore, is fixed relative to the body 1 of the valve. It will be appreciated that relative rotation of the sun gear 20 and the element 23 will cause relative axial motion between these two and this motion is restricted by shoulders 24 and 25 on the sun gear 20 engageable with co-operating shoulders 26 and 27 on the element 23.

Whilst the pitch circle diameter of the two sun gears is identical, the sun gear 20 has one more tooth than the sun gear 16. Hence, the planet gears 14 provide, with the first sun gear 16, a gear ratio which is different from the gear ratio provided by the planet gears 14 and the sun gear 20.

The above described valve operates in the following manner. Firstly, for manual operation of the valve it is necessary merely to rotate the handwheel 6. As both of the sun gears 16 and 20 will be prevented from rotation by engagement of the ring gear 12 with the pinion 11 on the motor shaft 10, rotation of the handwheel 6 and, therefore, the valve stem 4 will cause (by the inter-engagement of the threaded portion 18 on the stem 4 and the screw-thread 17 on the sun gear 16) the stem 4 to move axially relative to the valve body 1. Hence, by suitable rotation of the handwheel 6 the valve closure element 3 carried by the valve stem 4 will be moved away from or towards the valve seat 2 in accordance with the direction of rotation of the handwheel 6.

With valves of this type, the problem which arises is that a higher torque is required to unseat the valve closure element 3 from the valve seat 2 and (in the fully open position of the valve) to start movement of the valve closure element 3 towards the valve seat 2, than is required over the remainder of the range of its movement. Provision is made for this by the present invention. Assuming that the various parts of the valve are in the position shown (i.e. the valve is in its "closed" position), the motor 9 is now energised to rotate in the desired direction to "open" the valve.

Energisation of the motor 9 rotates the pinion 11 carried by its shaft 10 so as to rotate the ring gear 12 in a clockwise direction (looking at the valve from above) rotation of the ring gear 12, through the plates 13, carries the pinions 14 also in a clockwise direction around the valve stem 4. As the valve stem 4 will tend to remain stationary due to the fact that the valve closure element 3 is jammed on the valve seat 2, the sun gear 16 will likewise tend to remain stationary so that the pinions 14 will be rotated in the plates 13 as they roll round the sun gear 16. Due to the difference in ratio between that provided between the pinions 14 and the sun gear 16 and that provided between the pinions 14 and the sun gear 20, rolling of the pinions 14 round the sun gear 16 will cause slow rotation of the sun gear 20 which rotation will cause a relatively high torque to be applied between the inter-engaging screw threads 21 and 22. Such relative rotation of the screw threads 21 and 22 will result in axial relative movement between the sun gear 20 and the fixed element 23 and, in particular, the sun gear 20 will be forced upwardly. Upward movement of the sun gear 20 will be transmitted to the sun gear 16 and, hence, to the valve stem 4 so as to lift the valve closure element 3 away from the valve seat 2. Movement of the valve stem 4 in this manner will continue until the shoulder 25 on the sun gear 20 engages the shoulder 27 on the element 23. Upon this occurring, the sun gear 20 will be prevented from further upward movement and, therefore, from further rotational movement. When the sun gear 20 is so prevented from further movement, torque will be applied to the sun gear 16 as the pinion gears 14 now roll around the sun gear 20 and, remembering that the screw thread 17 on the sun gear 16 is of the opposite hand to the screw thread 21 on the sun gear 20, the movement upward of the stem 4 will be continued, the packing 5 providing sufficient friction as to prevent rotation of the valve stem 4. Due to the difference in the gear ratios above mentioned, the stem 4 will be moved upwardly by a force which is less than that which was applied to the stem 4 during its movement by virtue of the rotation of the sun gear 20. Such movement of the valve stem 4 will now continue until the valve is fully open.

Closing of the valve is performed in a similar manner.

When the valve has been fully opened, the valve closure member 3 will tend to be jammed in the "open" position and if the motor 9 is now operated in the reverse direction to close the valve, again, the sun gear 16 will tend not to rotate due to the jamming of the valve closure element 3. Hence, again, the pinions 14 will roll around the sun gear 16 to rotate the sun gear 20 in the reverse direction to its previous operation and such rotation of the sun gear 20 will move the valve stem 4 downwardly. This action will continue until the shouder 24 on the sun gear 20 engages the shoulder 26 on the element 23 whereafter (the sun gear 20 now being prevented from movement) movement of the stem 4 will continue by means of rotation of the sun gear 16 until even such movement is finally prevented by the valve closure element 3 being fully engaged with the valve seat 2.

In the above described embodiment, the packing 5 has been relied upon to constrain the stem 4 for linear movement (subject to the resistance of the packing 5 being overcome by manual operation of the valve upon manual rotation of the handwheel 6). However, the resistance provided by the packing 5 may be (initially or upon wear of the packing) insufficient to constrain the stem 4 for linear movement. In this case, specific means for providing such constraint may be incorporated in the valve. This specific means may comprise a tooth slidable within a slot carried by the stem 4, the tooth being withdrawable from the slot to permit rotation of the stem 4 upon manual operation of the handwheel 6.

Having thus described my invention what I claim is:

1. Means for moving a member constrained for linear movement between two positions, comprising an element which is co-axially rotatable about the member in both directions and which has rotatably mounted thereon planet gears which mesh with two sun gears and which provide with one of the sun gears a first gear ratio and with the second of the sun gears a second gear ratio different from the first gear ratio, said one sun gear having an axially extending screw thread of one hand threadedly engaged with a threaded portion on the member whereby relative rotation of said one sun gear and the member causes linear movement of the member, and said second sun gear having an axially extending screw thread of the opposite hand which threadedly engages a screw-threaded portion of an element whereby relative rotation of said second sun gear and the element causes relative axial motion between said second sun gear and the element, and means for limiting motion to an extent which is less than the extent of the linear movement of the member between its two positions.

2. Means as claimed in claim 1, wherein the member constitutes the stem of a screw-down valve.

3. Means as claimed in claim 2, wherein the member is constrained for linear movement by packing around the stem, which constraint may be overcome by manual rotation of the stem.

4. Means as claimed in claim 2, wherein there is provided a tooth slidable within a slot extending axially of the stem, the tooth being withdrawable from the slot to permit rotation of the stem.

5. Means as claimed in claim 1, wherein the element comprises a ring gear meshed with a pinion rotatable in both directions by a motor.

6. Means as claimed in claim 5, wherein the motor comprises a reversible electric motor.

7. Means as claimed in claim 1 including three planet gears.

8. Means as claimed in claim 1 wherein each of the planet gears has one half which is meshed with one sun gear and the other half which is meshed with the other sun gear.

9. Means as claimed in claim 1 wherein the difference of gear ratios is provided by a different number of teeth on the sun gears.

10. Means as claimed in claim 9, wherein the difference in the number of teeth on the sun gears is one.

11. Means as claimed in claim 1, wherein the element is fixed.

12. Means as claimed in claim 1, wherein said means comprises shoulders provided on the second sun gear which are engageable with co-operating shoulders on the element.

No references cited.

FRED C. MATTERN, Jr., *Primary Examiner.*

W. S. RATLIFF, *Assistant Examiner.*